United States Patent
Hoch

(10) Patent No.: US 9,791,970 B2
(45) Date of Patent: Oct. 17, 2017

(54) METHOD AND SYSTEM FOR DUAL NODE SENSING

(71) Applicant: Synaptics Incorporated, San Jose, CA (US)

(72) Inventor: David Hoch, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 389 days.

(21) Appl. No.: 14/580,022

(22) Filed: Dec. 22, 2014

(65) Prior Publication Data
US 2016/0179283 A1     Jun. 23, 2016

(51) Int. Cl.
| | | |
|---|---|---|
| G06F 1/16 | (2006.01) | |
| G06F 3/041 | (2006.01) | |
| G06F 3/044 | (2006.01) | |
| G06F 3/0488 | (2013.01) | |

(52) U.S. Cl.
CPC ............ *G06F 3/0418* (2013.01); *G06F 1/16* (2013.01); *G06F 3/044* (2013.01); *G06F 3/0416* (2013.01); *G06F 3/04883* (2013.01); *G06F 2203/04101* (2013.01)

(58) Field of Classification Search
CPC ..... G06F 3/0418; G06F 3/04883; G06F 3/044
See application file for complete search history.

(56) References Cited

U.S. PATENT DOCUMENTS

| | | |
|---|---|---|
| 5,945,980 A | 8/1999 | Moissev et al. |
| 8,054,300 B2 | 11/2011 | Bernstein |
| 8,674,958 B1 | 3/2014 | Kravets et al. |
| 2007/0018506 A1* | 1/2007 | Paik ............ H02J 9/06 307/115 |
| 2008/0157782 A1 | 7/2008 | Krah |
| 2008/0158183 A1 | 7/2008 | Hotelling et al. |
| 2009/0284495 A1 | 11/2009 | Geaghan et al. |
| 2010/0001973 A1 | 1/2010 | Hotelling et al. |
| 2010/0060608 A1 | 3/2010 | Yousefpor |
| 2010/0164889 A1 | 7/2010 | Hristov et al. |
| 2010/0245286 A1 | 9/2010 | Parker |
| 2010/0253651 A1* | 10/2010 | Day ............ G06F 3/044 345/175 |

(Continued)

FOREIGN PATENT DOCUMENTS

| | | |
|---|---|---|
| KR | 20100040318 A | 4/2010 |
| KR | 20140084883 A | 7/2014 |

OTHER PUBLICATIONS

International Search Report and Written Opinion of the International Searching Authority in related International Application No. PCT/US2015/066831 dated May 17, 2016 (11 pages).

*Primary Examiner* — Giovanni Astacio-Oquendo
*Assistant Examiner* — Alvaro Fortich
(74) *Attorney, Agent, or Firm* — Osha Liang LLP

(57) ABSTRACT

A system for a capacitive sensing device includes transmitter electrodes configured to transmit transmitter signals, receiver electrodes configured to receive resulting signals including effects corresponding to the transmitter signals. The system further includes dual nodes corresponding to a first capacitive coupling between the transmitter electrodes and the receiver electrodes, and primary nodes corresponding to a second capacitive coupling between the transmitter electrodes and the receiver electrodes. The first capacitive coupling is less than the second capacitive coupling.

18 Claims, 9 Drawing Sheets

(56) References Cited

U.S. PATENT DOCUMENTS

| | | | |
|---|---|---|---|
| 2010/0292945 A1 | 11/2010 | Reynolds et al. | |
| 2010/0308844 A1* | 12/2010 | Day | G06F 3/045 |
| | | | 324/663 |
| 2011/0006832 A1 | 1/2011 | Land et al. | |
| 2011/0025629 A1 | 2/2011 | Grivna et al. | |
| 2011/0061949 A1 | 3/2011 | Krah et al. | |
| 2012/0019478 A1 | 1/2012 | Bulea | |
| 2012/0043971 A1 | 2/2012 | Maharyta | |
| 2012/0081335 A1 | 4/2012 | Land et al. | |
| 2012/0207244 A1* | 8/2012 | Weinerth | H03K 17/002 |
| | | | 375/316 |
| 2013/0002149 A1* | 1/2013 | Mott | H02M 1/088 |
| | | | 315/161 |
| 2013/0173211 A1* | 7/2013 | Hoch | G06F 3/044 |
| | | | 702/150 |
| 2013/0181942 A1* | 7/2013 | Bulea | G06F 3/044 |
| | | | 345/174 |
| 2013/0187705 A1* | 7/2013 | Kaltner | G06F 3/044 |
| | | | 327/517 |

* cited by examiner

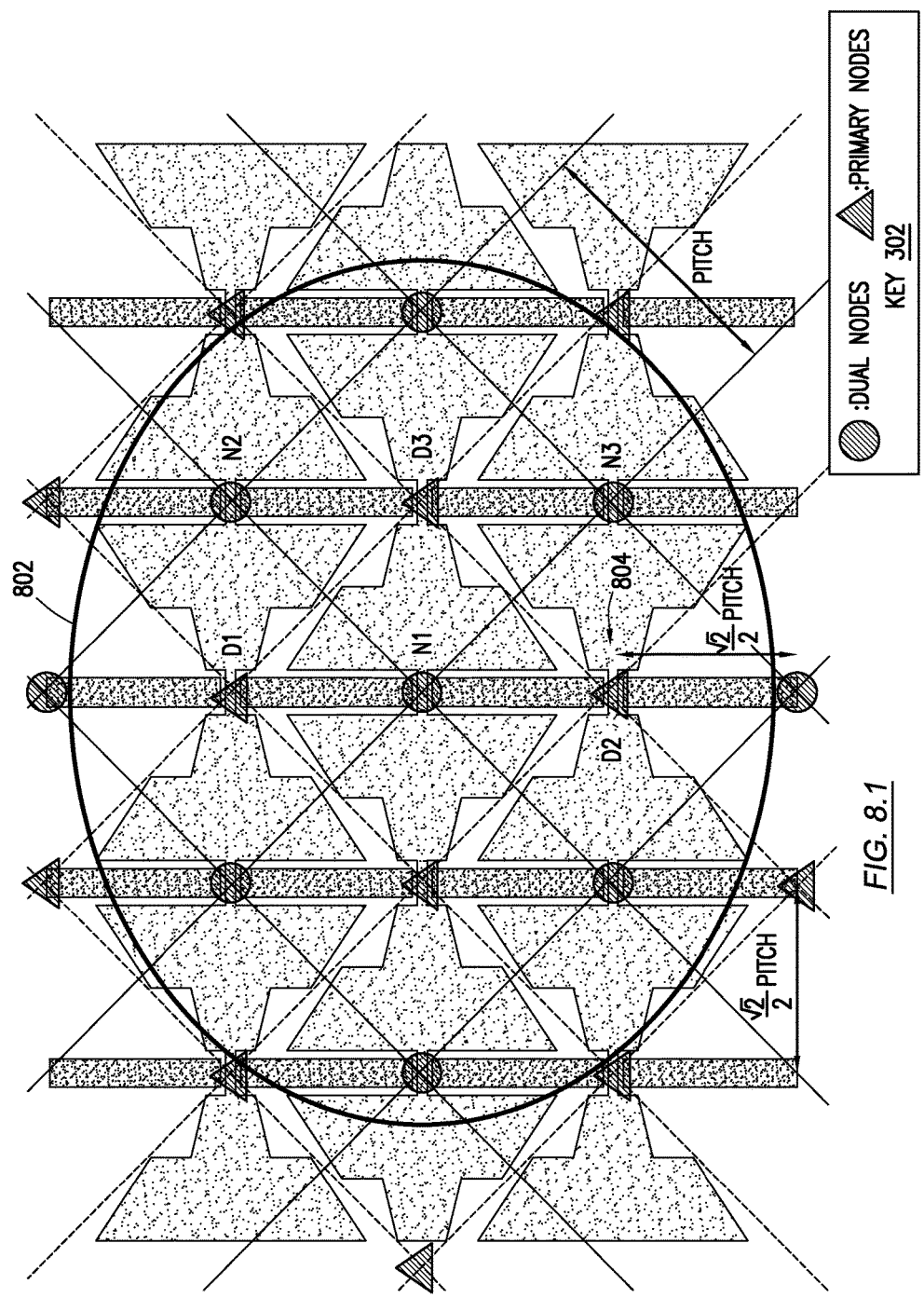
FIG. 8.1

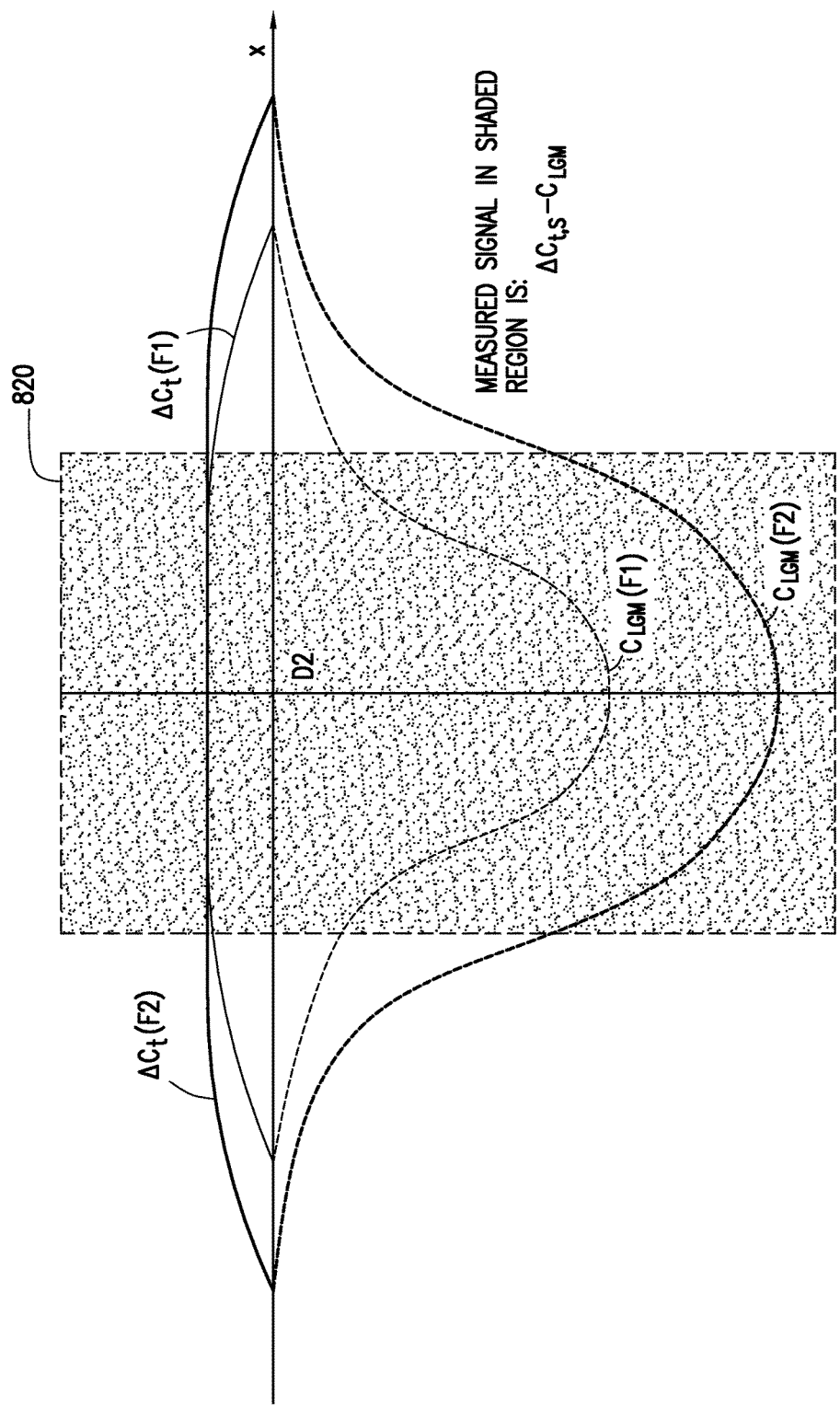
FIG. 8.2

METHOD AND SYSTEM FOR DUAL NODE SENSING

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a system for a capacitive sensing device including transmitter electrodes configured to transmit transmitter signals, receiver electrodes configured to receive resulting signals including effects corresponding to the transmitter signals. The system further includes dual nodes corresponding to a first capacitive coupling between the transmitter electrodes and the receiver electrodes, and primary nodes corresponding to a second capacitive coupling between the transmitter electrodes and the receiver electrodes. The first capacitive coupling is less than the second capacitive coupling.

In general, in one aspect, embodiments relate to a processing system for a capacitive sensing device that includes a sensor module coupled to transmitter electrodes and receiver electrodes. The sensor module is configured to transmit a transmitter signals with the transmitter electrodes and receive, with the receiver electrodes, first resulting signals and a second resulting signals. The processing system includes a determination module that is configured to acquire a first capacitive measurement using the first resulting signals, acquire a second capacitive measurement using the second resulting signals, determine a first low ground mass measurement based on the first capacitive measurement, determine positional information based on the second capacitive measurement and the first low ground mass measurement, and report the positional information.

In general, in one aspect, embodiments relate to a capacitive input device that includes transmitter electrodes configured to transmit transmitter signals, receiver electrodes configured to receive resulting signals comprising effects corresponding to the transmitter signals, dual nodes corresponding to a first capacitive coupling between the transmitter electrodes and the receiver electrodes, and primary nodes corresponding to a second capacitive coupling between the transmitter electrodes and the receiver electrodes. The second capacitive coupling is greater than the first capacitive coupling. The input device includes a processing system configured to transmit transmitter signals with the transmitter electrodes and receive, with the receiver electrodes, first resulting signals and second resulting signals, acquire a first capacitive measurement using the first resulting signals, the first capacitive measurement corresponding to the dual nodes, and acquire a second capacitive measurement using the second resulting signals, the second capacitive measurement corresponding to the plurality of primary nodes. The processing system is further configured to determine a first low ground mass measurement based on the first capacitive measurement, determine positional information based on the second capacitive measurement and the first low ground mass measurement, and report the positional information.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 8.1 and 8.2 show an example in accordance with one or more embodiments of the invention.

DETAILED DESCRIPTION

Figure 1:
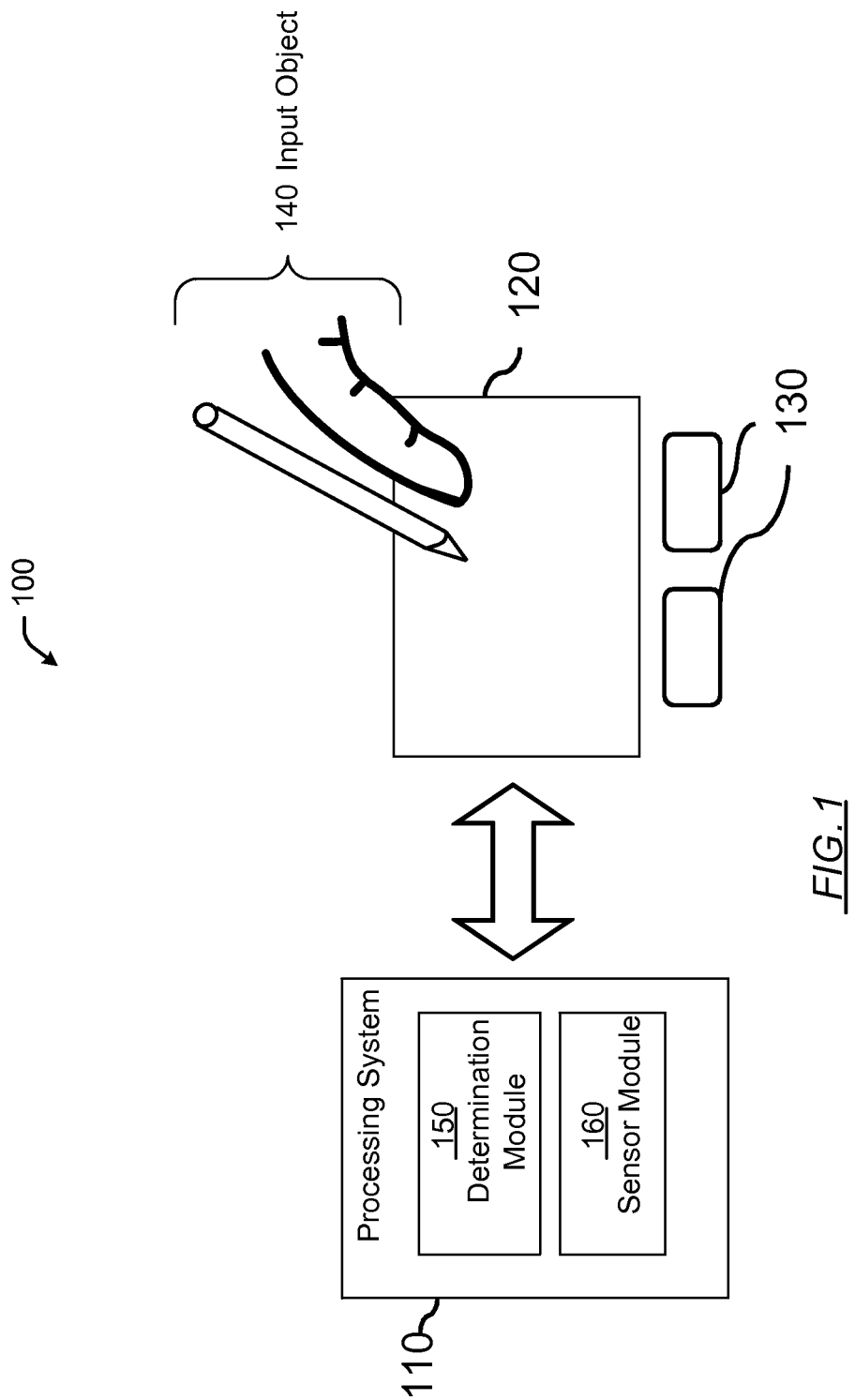
FIG. 1 shows a block diagram of an example system that includes an input device in accordance with an embodiment of the invention.

Specific embodiments of the invention will now be described in detail with reference to the accompanying figures. Like elements in the various figures are denoted by like reference numerals for consistency. In the figures, three co linear dots indicate that additional items of similar type to the preceding and/or succeeding items with respect to the dots may optionally exist.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments of the invention are directed to a correction for when the ground condition or ground mass environment of the input device is a low ground mass environment. In various embodiments, the ground condition of the input device corresponds to free-space capacitive coupling in series between the input device-universe and the input object-universe. In various embodiments, when the coupling between the input device and the universe (free-space coupling coefficient) is relatively small, the device may be considered to be in a low ground mass state. However, when the coupling between the capacitive sensing device and the universe is substantially larger, the device may be considered to be operating in a good ground mass state. Further, when the coupling between an input object and system ground of the input device is substantially large, the input device may be in a good ground mass condition In general, embodiments of the invention are directed to dual node sensing to correct for low ground mass. In the dual node sensing, capacitive measurements are taken on primary nodes and on dual nodes. The primary nodes are designed to maximize the trans-capacitive signal to noise ratio. The dual nodes are designed to minimize the trans-capacitive signal and maximize the parasitic low ground mass contribution in accordance with one or more embodiments of the invention. Information from the dual nodes may be used to perform low ground mass correction of measurements obtained via the primary nodes in accordance with one or more embodiments of the invention.

Low ground mass correction may be applied when a low ground mass condition is detected and the input device is operating in a low ground mass mode. Further, when a low ground mass condition is not detected, i.e., a high ground mass condition is detected, the low ground mass correction is not applied because the determined correction term is negligible in accordance with one or more embodiments of the invention. When low ground mass correction is not applied, the sensing device may operate under a normal operating mode. While operating in a normal mode, "N" number of input objects may be detected and reported and, while operating in a low ground mass mode, "M" number of input objects may be detected and reported in accordance with one or more embodiments of the invention. In various embodiments, "N" is greater than "M". For example, "M" may be two and "N" is greater than two. In other embodiments, "M" three and "N" is greater than three. In yet other embodiments, "N" and "M" may be equal. In such embodiments, "M" and "N", may be three or less; however, a higher number of input objects may also possible.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be implemented as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, the particular input objects that are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by way of face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces.

Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with a varying voltage signal or exciting a sensor electrode. Conversely, sensor electrodes may be connected to a ground (e.g., system ground or any other ground). Connecting the sensor electrodes to a ground or holding electrodes substantially constant may be referred to as connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. The effect(s) may be the transmitter signal, a change in the transmitter signal caused by one or more input objects and/or environmental interference, or other such effects. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine a presence of a low ground mass artifact, correct for low ground mass, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include analog hardware and/or digital elements coupled to a transmitting portion of the sensing elements. The receiver module may include analog hardware and/or digital elements coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware, such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in various ways, such that a single module or the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions, such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information," as used herein, broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer-readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

As discussed above, in mutual capacitive sensing techniques, transmitter electrodes send transmitter signals. Receiver electrodes receive resulting signals that are affected by, and thus, include the effects of the transmitter signals, interference, and any input objects in the sensing region. The path of signals from the transmitter electrode to the receiver electrode is through a node, for which a distinct measurement value may be obtained. In other words, a node is a capacitive connection point between a transmitter electrode and a receiver electrode from which a measurement value may be obtained.

In one or more embodiments of the invention, a unique node exists for each transmitter electrode and receiver electrode pair, and each transmitter electrode and receiver electrode pair has a corresponding node. Primary nodes are larger connections than dual nodes in accordance with one or more embodiments of the invention. In other words, the capacitive coupling between the transmitter electrode and receiver electrode is larger at primary nodes than at dual nodes. Because of the comparatively larger capacitive coupling, measurement values at primary nodes reflect a maximized signal to noise ratio while the measurement values at the dual nodes reflect a minimized signal to noise ratio. For example, the primary node may have a delta Ct signal (i.e., change in capacitance between transmitter and receiver) that is ten times the signal as on the dual node. By way of a more concrete example, if the noise level is 5 Femtofarad (fF) at the dual nodes, the delta Ct for the dual node may be 20 fF or 4 times the noise level, and the delta Ct for the primary node may be 200 fF. The above is only an example, other amounts for the delta Ct for primary and dual nodes and other variations between the primary and dual nodes may exist without departing from the scope of the invention.

Figure 2:
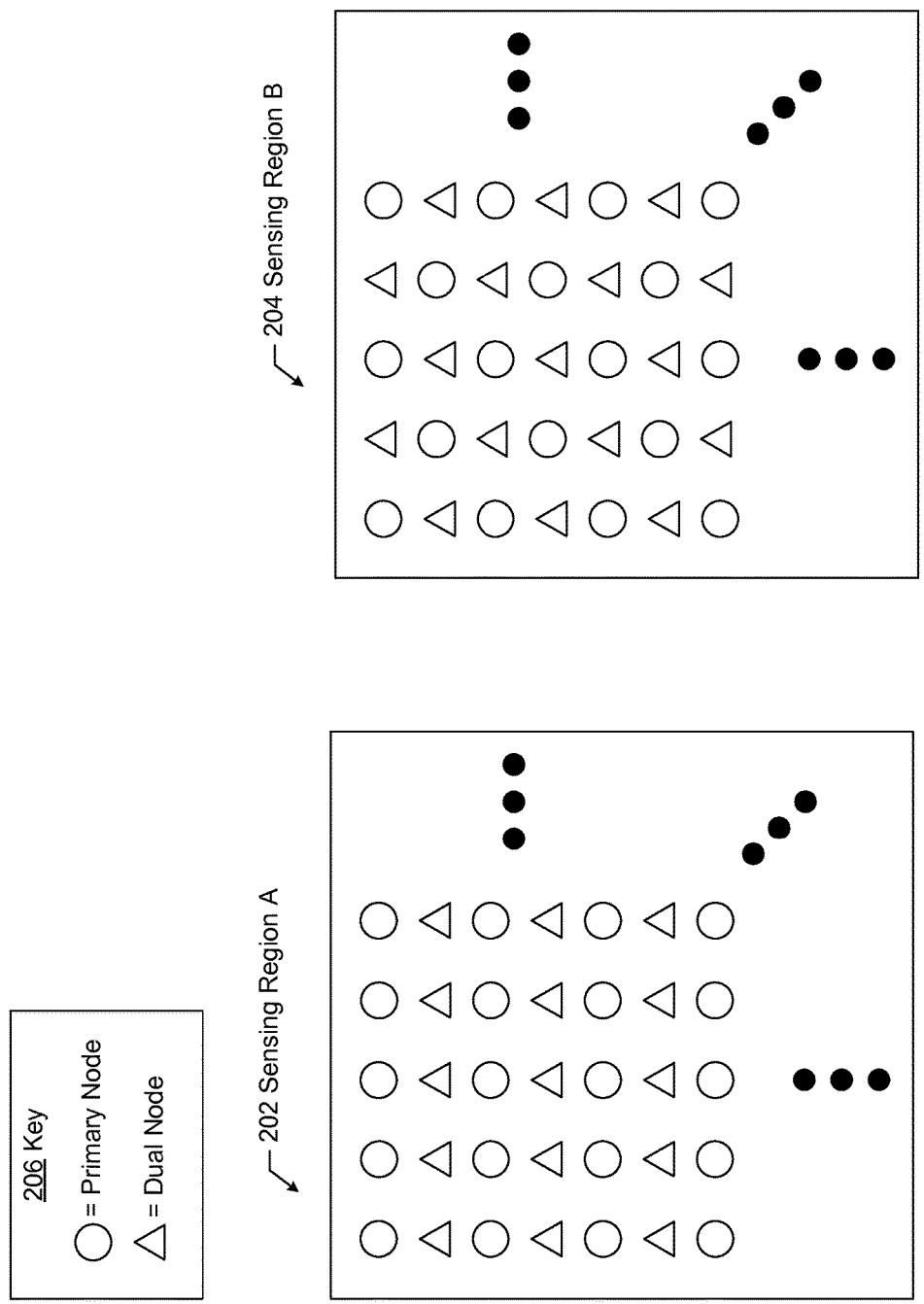
FIG. 2 shows examples of sensing regions in accordance with one or more embodiments of the invention.

FIG. 2 show example layouts of nodes in a sensing region (e.g., sensing region A (202), sensing region 13 (204)). As shown by the key (206), primary nodes are shown with a circle and dual nodes are shown with a triangle. In one or more embodiments of the invention, the primary nodes distributed throughout the sensing region. Similarly, the dual nodes may be distributed throughout the sensing region. One or both of the distributions may be evenly or regularly spaced in one or two directions across the sensing region.

The regular spacing may be with respect to a single type of nodes or with respect to all types of nodes. Specifically, in some embodiments, the spacing between any two adjacent nodes may be the same regardless of the type of node, whether primary or dual. In some other embodiments, the spacing between each primary node and the primary node's closest adjacent dual node is less than the spacing between any two adjacent dual nodes. In some embodiments, the spacing between each primary node and the primary node's closest adjacent dual node is less than the spacing between any two adjacent primary nodes. Other spacing scenarios may exist without departing from the scope of the invention.

Sensing region A (202) shows an example of a single directional alternating grid layout in which primary nodes and dual nodes are regularly spaced, regardless of the type of node. As shown in the example, single directional alternating grid layout, the primary nodes and dual nodes are both distributed throughout the sensing region. Further, the primary nodes may alternate with the dual nodes in just the vertical direction.

In some embodiments of the invention, the single directional alternating grid layout may be achieved, for example, by having different transmitter electrodes for the primary nodes than for the dual nodes, and the same receiver electrode for both dual nodes and primary nodes. In other embodiments of the invention, the single directional alternating grid layout may be achieved, for example, by having different receiver electrodes for the primary nodes than for the dual nodes, and the same transmitter electrode for both dual nodes and primary nodes.

Sensing region B (204) shows an example of a two directional alternating grid layout in which primary nodes and dual nodes are regularly spaced regardless of the type of node. As shown in the example, two directional alternating grid layout, the primary nodes and dual nodes are both distributed throughout the sensing region. Further, the primary nodes may alternate with the dual nodes in both the vertical and the horizontal directions. In some embodiments of the invention, the dual directional alternating grid layout may be achieved, for example, by having the same transmitter electrodes and receiver electrodes for both the primary nodes and the dual nodes. In other words, a single transmitter electrode may transmit transmitter signals that pass through both a primary node and a dual node. Similarly, a single receiver electrode may receive resulting signals from both a primary node and a dual node.

Although FIG. 2 shows only two layouts, other layouts are possible without departing from the scope of the invention. Further, although not shown in FIG. 2, various layouts may be achieved, for example, by transmitter electrodes and receiver electrodes that are on the same side of at least one substrate. In one or more embodiments, the transmitter and receiver electrodes are disposed on the same side of substrate, wherein one of the transmitter and receiver electrodes comprise jumpers at crossover regions between the transmitter and receiver electrodes, such that the jumpers are insulated from the other one of the transmitter and receiver electrodes. Alternatively, various layouts may be achieved, for example, by transmitter electrodes and receiver electrodes that are on different sides of at least one substrate or on different substrates. Further, the sensor electrodes may be disposed such that their size, shape, quantity and/or orientation may vary between layouts.

Figure 3:
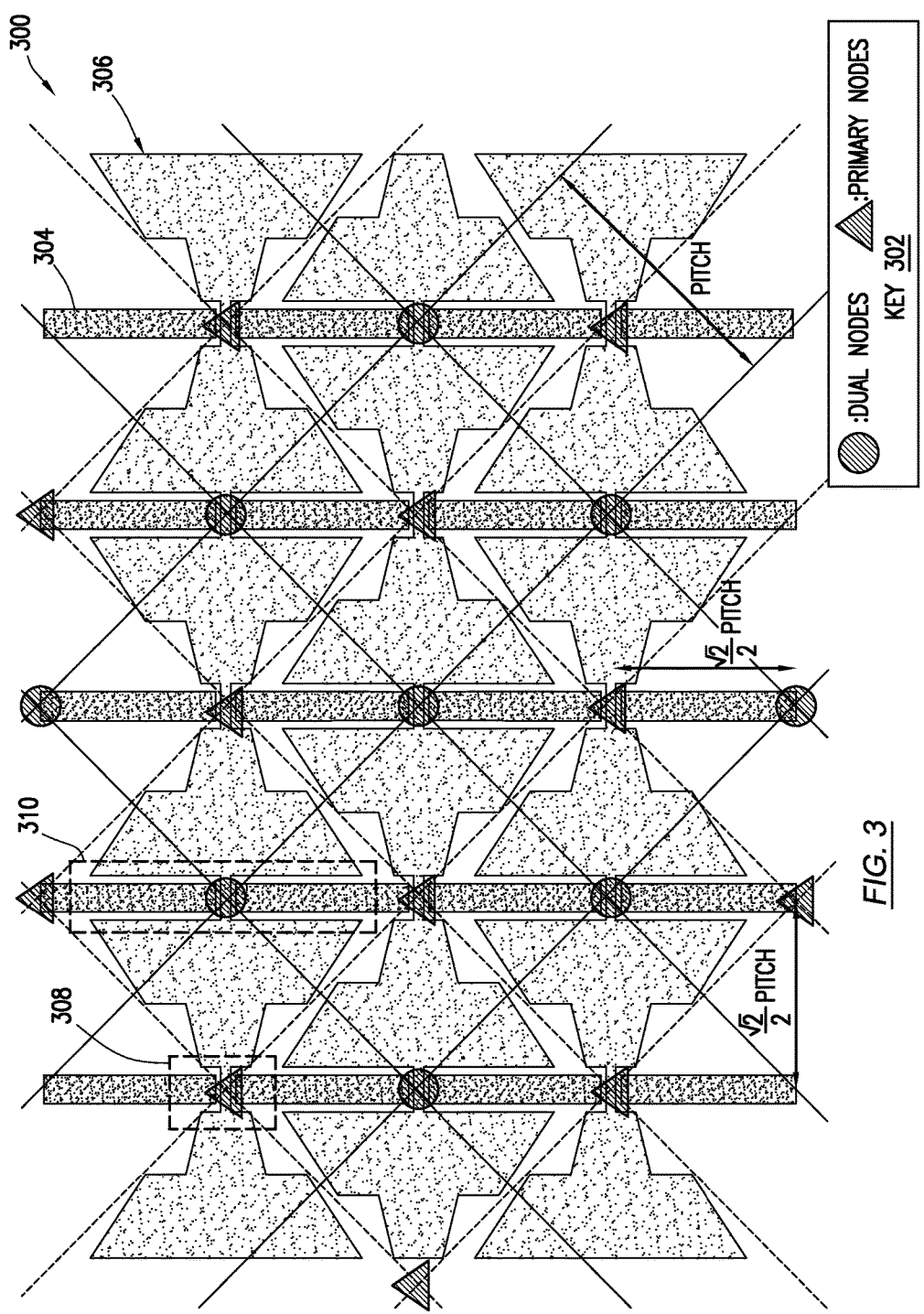
FIGS. 3-5 show example schematic diagrams of grids in accordance with one or more embodiments of the invention.

FIG. 3 shows an example diagram of a layout of sensor electrodes (300) in accordance with one or more embodiments of the invention. As shown by the key (302), primary nodes are shown as circles and dual nodes are shown as triangles. In the example diagram, receiver electrodes (e.g., receiver electrode (304)) receive resulting signals using the vertical bars along the sensing region, while transmitter electrodes (e.g., transmitter electrode (306)) transmit transmitter signals using the irregularly shaped horizontal structure.

Each node has a corresponding connection region that represents the amount of connection between the transmitter electrode and the receiver electrode. FIG. 3 shows the interaction region at a primary node (310) and the interaction region at the dual node (308). As shown in FIG. 3, because of the irregularly shaped horizontal structure, a larger interaction region exists between the transmitter electrode and receiver electrode at the primary node than at the dual node. In one or more embodiments of the invention, the larger interaction region is caused by the transmitter electrode having a larger surface area facing the receiver electrode at the primary node than at the dual node. Thus, the primary nodes are exposed to as much interaction between receiver electrodes and transmitter electrodes while the dual nodes are exposed to as little interaction as possible. Reducing the interaction for the dual nodes may be performed alternatively or additionally, by adding another set of electrodes that are driven at any potential, in between the transmitter electrodes and receiver electrodes.

Further, in the example shown in FIG. 3, the grid in this example is not a standard transmitter receiver intersection (Cartesian) grid. Rather, the example Cartesian grid is rotated by forty-five degrees. The rotation may result in about a 30% increase in transmitter electrode and receiver electrodes as compared to a standard transmitter receiver intersection (Cartesian) grid. However, if both the primary and dual nodes are used for the reconstruction, the pitch of the dual and primary grid may be chosen larger than in a standard design to achieve the same positional accuracy. In such a scenario, the additional of additional electrodes needed than a standard design may be determined on a case by case basis. The amount of rotation may vary without departing from the scope of the invention. Further, although FIG. 3 shows a one-sided, one-prong design (mostly for simplicity reasons), any number of prongs may exist without departing from the scope of the invention.

Figure 4:
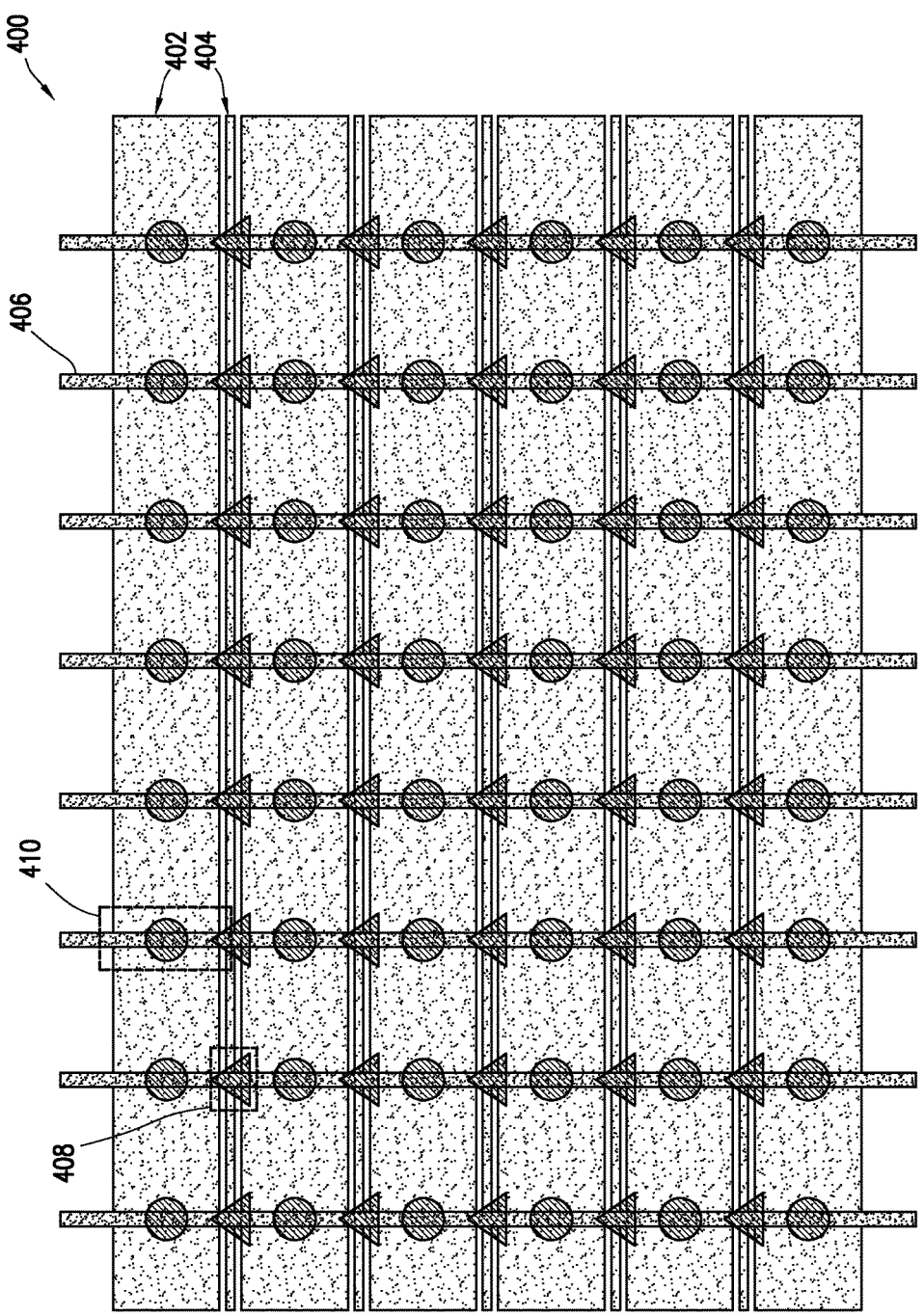

FIG. 4 shows an example diagram of a layout of sensor electrodes (400) in accordance with one or more embodiments of the invention. Specifically, FIG. 4 shows the layout in the 2-sided case. As with FIG. 3, primary nodes are shown as circles and dual nodes are shown as triangles. In FIG. 4, the grid is a standard shaped grid with the transmitters (e.g., primary transmitter (402), dual transmitter (404)) perpendicular to the receivers (e.g., receiver (406)). Further, the dual grid or grid of dual nodes is shifted in the receiver direction by half a pitch to the primary grid or grid of primary nodes.

In the example of FIG. 4, a primary node is created by interaction between a primary transmitter (e.g., primary transmitter (402)) and a receiver (e.g., receiver (406)). Conversely a dual node is created by interaction between a dual transmitter (e.g., dual transmitter (404)) and the receiver (e.g., receiver (406)). In other words, a separate set of dual transmitters exist to create the dual nodes. The dual transmitters are slimmer than the primary transmitters. Thus, the interacting region at the dual nodes (408) is much smaller than the interacting region at the primary nodes (410). In one or more embodiments of the invention, 100% more transmitter electrodes may be used to create the layout of FIG. 4 while the number of receiver electrodes may not change. However, if the dual nodes can be fully used for the image reconstruction, the corresponding pitch may be chosen larger than in the standard design (i.e., standard transmitter and receiver electrode (Cartesian) grid) to achieve the same positional accuracy. In such a scenario, whether the amount of transmitters is larger, equal or smaller than in a standard design may be dependent on the specific design. Although FIG. 4 shows varying size connection regions between the primary and dual nodes, the connection regions for the primary and dual nodes may be the same size.

Figure 5:
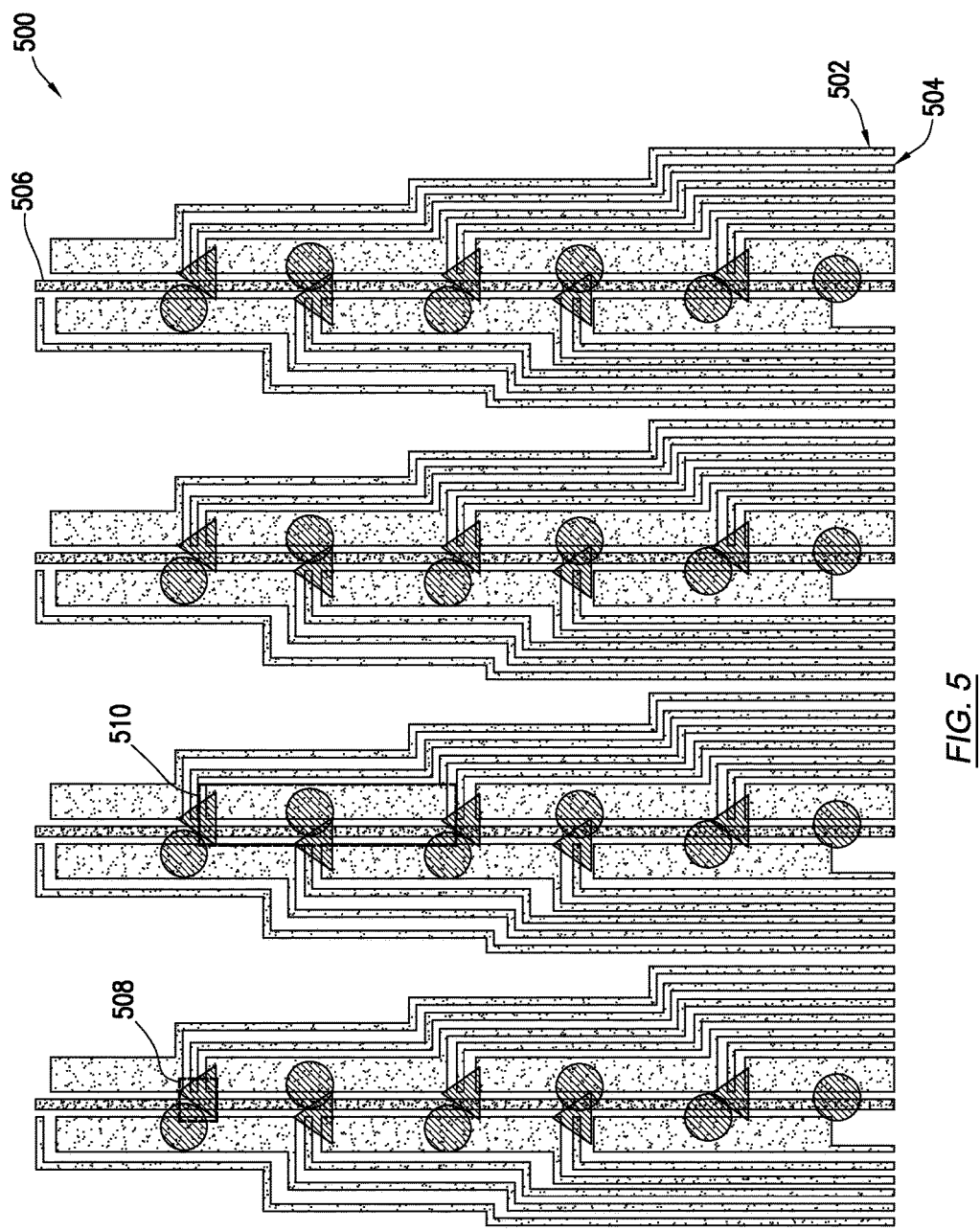

FIG. 5 shows another example diagram of a layout of sensor electrodes (500) that are arranged in a single layer. As with FIGS. 3 and 4, primary nodes are shown as circles and dual nodes are shown as triangles. In FIG. 5, the transmitters (e.g., primary transmitter (502), dual transmitter (504)) lead from the same axis and are generally parallel to the receivers (e.g., receiver (506)). Further, the dual grid or grid of dual nodes is shifted by a full pitch along the receiver electrodes to the primary grid or grid of primary nodes.

In the example of FIG. 4, a primary node is created by an interaction between a primary transmitter (e.g., primary transmitter (502)) and a receiver (e.g., receiver (506)). Conversely, a dual node is created by an interaction between a dual transmitter (e.g., dual transmitter (504)) and the receiver (e.g., receiver (506)). In other words, a separate set of dual transmitters exist to create the dual nodes. The primary transmitters are irregularly shaped to have a larger endpoint than the dual transmitters. Thus, the connection region at the dual nodes (508) is much smaller than the connection region at the primary nodes (510). In one or more embodiments of the invention, 100% more transmitter electrodes may be used to create the layout of FIG. 5 while the number of receiver electrodes may not change. However, if the dual nodes can be fully used for the reconstruction, the corresponding pitch may be chosen to be larger than of the standard design to achieve the same positional accuracy. As such, the number of transmitter electrodes for a dual node sensor is dependent on the specific design. For example, the number of transmitter electrodes for a dual node sensor needed is one of larger, equal to or smaller than in a standard design.

The grids in FIGS. 3-5 are for example purposes only and not intended to limit the scope of the invention. Specifically, although the example grids have the transmitters of varying sizes, the receivers may be varying sizes without departing from the scope of the invention.

Figure 6:
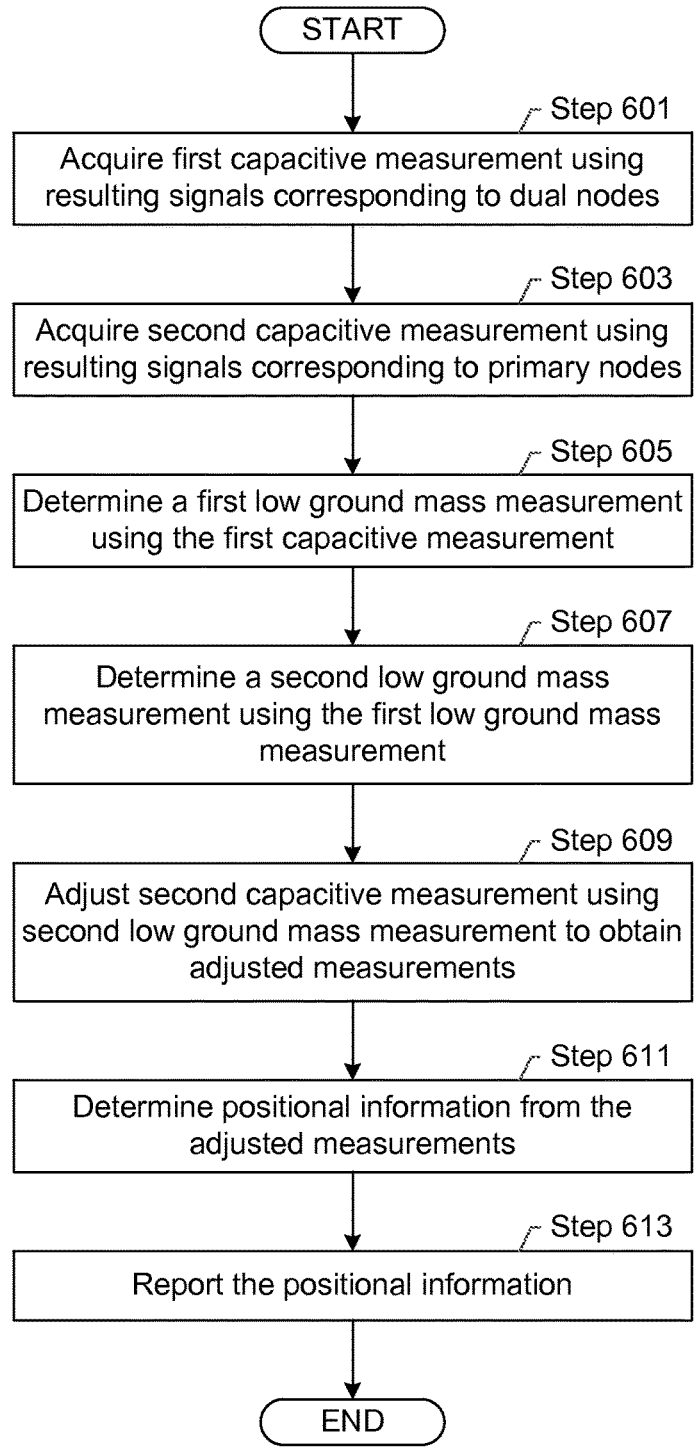
FIGs. 6 and 7 show flowcharts in accordance with one or more embodiments of the invention.
Figure 7:
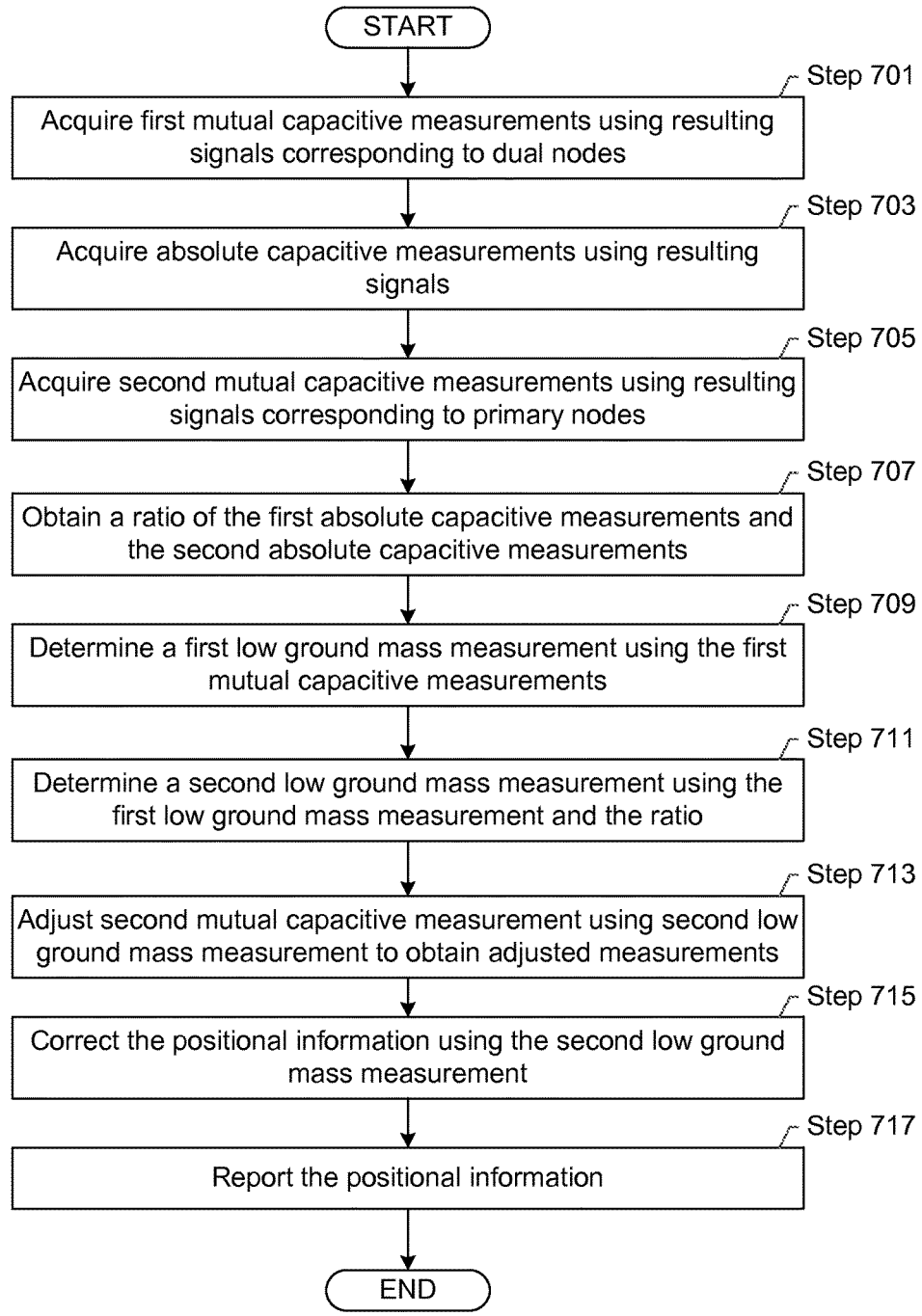

FIGS. 6 and 7 show flowcharts in accordance with one or more embodiments of the invention. The various steps of FIGS. 6 and 7 may be performed by the various components of FIGS. 1-5. Further, some steps may be performed by a host computing device. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 6 shows a flowchart for performing dual node sensing in accordance with one or more embodiments of the invention. In Step 601, a first capacitive measurement is acquired using resulting signals corresponding to the dual nodes in accordance with one or more embodiments of the invention. In one or more embodiments of the invention, the first capacitive measurements are acquired using standard mutual capacitive sensing techniques. However, rather than a measurement being acquired for all nodes, the measurements are acquired for the dual nodes. For example, the sensor module may drive the transmitter electrodes corresponding to the dual nodes to transmit a transmitter signal. Resulting signals may be received by receiver electrodes from the dual nodes.

In Step 603, a second capacitive measurement is acquired using resulting signals corresponding to the primary nodes in accordance with one or more embodiments of the invention. In one or more embodiments of the invention, the second capacitive measurements are acquired using standard mutual capacitive sensing techniques. However, rather than a measurement being acquired for all nodes, the measurements are acquired for the primary nodes. For example, the sensor module may drive the transmitter electrodes corresponding to the primary nodes to transmit a transmitter signal. Resulting signals may be received by receiver electrodes from the primary nodes. Further, Steps 601 and 603 may be performed in any order, consecutively or concurrently. Under normal circumstances, steps 601 and 603 may be performed simultaneously to save time for gathering the information and to capture the same exact time with the noise sources corresponding to the same time frame.

In Step 605, a first low ground mass measurement is determined using the first capacitive measurement in accordance with one or more embodiments of the invention. In one or more embodiments of the invention, because the dual nodes minimize the mutual capacitive signal, the first capacitive measurement is indicative of the amount of parasitic low ground mass term. In general, the larger the first capacitive measurement, the worse the ground mass state of the input device and the higher the first low ground mass measurement is in the measurement's magnitude. In one or more embodiments of the invention, a separate low ground mass measurement is acquired for each dual node using the corresponding first capacitive measurement. The separate low ground mass measurements may or may not be combined to a single or set of measurements. Various functions may be applied to determine the first low ground mass measurement of the input device.

In Step 607, from the first low ground mass measurement, a second low ground mass measurement is determined in accordance with one or more embodiments of the invention. The second low ground mass measurement is a correctional factor to apply to the second capacitive measurement. In one or more embodiments of the invention, the second low ground mass measurement is proportional to the first low ground mass measurement. Various functions may be applied to determine the second low ground mass measurement of the input device.

In Step 609, the second capacitive measurement is adjusted using the second low ground mass measurement to obtain an adjusted measurement in accordance with one or more embodiments of the invention. In particular, a mathematical function is applied to the second capacitive measurement to remove low ground mass as measured by the second low ground measurement. The mathematical function may be, for example, a subtractive function.

In Step 611, positional information is determined from the adjusted measurement in accordance with one or more embodiments of the invention. Determining positional information may be performed using various techniques. For example, temporal and spatial filters may be applied, noise correction may be performed, and other preprocessing may be performed to further adjust the capacitive measurements. From the adjusted measurements, nodes that have an adjusted measurement value greater than a threshold may be identified as corresponding to an input object. The positions of the nodes having a greater adjusted measurement value than a threshold may be identified as the positions of the input object. The adjusted measurement value may also be used to determine the vertical position of the input object. Positional information from prior sensing frames may be used to determine velocity and other information.

In Step 613, the positional information is reported in accordance with one or more embodiments of the invention. For example, the determination module or processing system may report the positional information to a host computing device. Alternatively or additionally, the host computing device may report the positional information to an application executing on the host computing device. Based on the positional information, the host computing device or the application may perform an action changing the state of at least a portion of the computing device.

FIG. 7 shows a flowchart for dual node sensing in accordance with one or more embodiments of the invention. In Step 701, a first mutual capacitive measurement is acquired using resulting signals corresponding to the dual nodes in accordance with one or more embodiments of the invention. Step 701 may be performed in a same or similar manner to the techniques discussed above with reference to Step 601.

In Step 703, absolute capacitive measurements are acquired using resulting signals in accordance with one or more embodiments of the invention. In one or more embodiments of the invention, the transmitter electrodes are driven and received with. Further, the receiver electrodes may be driven and received with as well. Resulting signals are received with both the transmitter and receiver electrodes to measure the absolute capacitance of each sensor electrode. Thus, the resulting signals are reflective of the change in capacitance over all nodes. In other words, each sensor electrode may measure a single measurement value for the multiple dual nodes. Thus, the absolute capacitance sensing may create a profile of capacitance of the sensing region for both axis.

In Step 705, a second mutual capacitive measurement is acquired using resulting signals corresponding to the primary nodes in accordance with one or more embodiments of the invention. Step 705 may be performed in a same or similar manner to the techniques discussed above with reference to Step 603. Further, Steps 701-705 may be performed in any order, consecutively or concurrently.

In Step 707, a ratio for the absolute capacitive measurements may be determined. The ratio may be the ratio of an absolute capacitance measurement of one sensor electrode and a neighboring sensor electrode. Specifically, consider the scenario in which the value of the profile is greatest at position x. The value in the profile on one axis that is connected to position x, may be divided by the value in the profile on one axis that is connected to a neighboring position that is immediately adjacent to position x. Because of the grid layout the position and the neighboring position may correspond to a primary node and dual node. Thus, the ratio is reflective of the change in capacitance between primary nodes and dual nodes.

In Step 709, a first low ground mass measurement is determined using the first mutual capacitive measurement in accordance with one or more embodiments of the invention. Step 709 may be performed in a same or similar manner to the techniques discussed above with reference to Step 605.

In Step 711, using the first low ground mass measurement and the ratio, a second low ground mass measurement is determined in accordance with one or more embodiments of the invention. The second low ground mass measurement is a correctional factor to apply to the second capacitive measurement. In one or more embodiments of the invention, the second low ground mass measurement is proportional to the first low ground mass measurement. Various functions may be applied to determine the second low ground mass measurement of the input device.

In Step 713, the second capacitive measurement is adjusted using the second low ground mass measurement to obtain an adjusted measurement in accordance with one or more embodiments of the invention. In Step 715, positional information is determined from the adjusted measurement in accordance with one or more embodiments of the invention. In Step 717, the positional information is reported in accordance with one or more embodiments of the invention. Steps 713-717 may be performed in a same or similar manner to the techniques discussed above with reference to Step 609-613.

FIGS. 8.1 and 8.2 show an example in accordance with one or more embodiments of the invention. Specifically, FIG. 8.1 shows the same example layout of the sensor electrodes as in FIG. 3. FIG. 8.1 also shows a finger in the sensing region at position (802) denoted by the oval and shading. The finger is sufficiently large to reach saturation in the change in capacitance (i.e., deltaCt) term for the sensor electrode in nodes N1, D1, D2 and D3. Node D2 (804) is a dual node. Even if the finger moves a bit to the right, the finger is so huge compared to this localized node D2 (804), that saturation of deltaCt still occurs. Only if the finger moves far to the left, a point is reached when the deltaCt starts dropping, until deltaCt reaches zero.

FIG. 8.2 shows an example cross section of the Pixel Response Function (PRF) on the dual nodes for two different size fingers F1 and F2 in the sensing region, F2 being larger than F1. The PRF shows the capacitive response at a fixed pixel which is obtained when moving the object to an arbitrary location and reporting at that location the measured value at the fixed pixel. If the input object is sufficiently large and centered about that pixel location, the input object covers the entire intersection between transmitter electrode and receiver electrode at that pixel. If the object is even larger, the object will not change the deltaCt and, hence, saturation is reached for a sufficiently large object.

In the example FIG. 8.2, both fingers F1 and F2 are sufficiently large to reach saturation in the deltaCt term for the sensor electrode. The actual PRF may be three-dimensional and FIG. 8.2 shows a cross section of the PRF with a fixed y-axis. The region denoted by box (820) shows the finger positions when saturation of the mutual capacitive signal is reached. The saturation may be measured through a calibration in an absolutely good ground condition. As a consequence, the CLGM over the dual nodes may be calculated by subtracting the node's saturated value (i.e., $deltaCt\_\{t,S\}$) from the mutual capacitance measurement at the node. If the finger is in the transitioning region of the PRF and the procedure is done nevertheless, the error of determining CLGM may not be significant because per construction, deltaCt over the dual node is small. Based on the CLGM term in the interior of an input object in the sensing region, the dual nodes provide constant real time information about the LGM condition of the sensor.

As a result of having information on the dual nodes, the primary nodes that are touched by the finger are identifiable. On the primary nodes, the goal is to measure the mutual capacitive signal. If CLGM is around zero on the dual nodes, the trans-cap measurements are not corrupted on the primary nodes in accordance with one or more embodiments of the invention. The PRFs on the primary nodes may appear similarly to FIG. 8.2, with the difference being that the saturated mutual capacitive signal is much larger on the primary nodes than on the dual nodes, and saturation is only reached for significantly larger fingers. As a matter of fact, the finger diameter in FIG. 8.1 may be in the order of twice the pitch or larger to reach saturation for a primary node, while the diameter may be only about a tenth of a pitch or larger to reach saturation for a dual node. The CLGM term determined over the dual nodes may correct for the low ground mass on the primary nodes.

In one or more embodiments of the invention, the low ground mass of a sensor may be dependent on several different factors, such as how well the sensor is grounded, how large the sensor is, and what self-capacitance of the sensor is, size of the detected input object(s) and other factors. Even for a fixed sensor design, the low ground mass behavior may change in a fraction of seconds, depending what the user is doing with the device. One or more embodiments may provide a reliable, interactive warning system in place, which regularly provides information about the real-time low ground mass situation of the sensor. Specifically, because the dual nodes are constructed in such a fashion that the interaction between a receiver electrode and the neighboring transmitter electrode are strongly localized to a small region, the measured deltaCt is on the one side very small, on the other side practically any object of a sufficiently large size will quickly saturate the deltaCt if in the sensing region above such a dual node. But the parasitic low ground mass capacitance term can be in a similar order as on the dual nodes, so significantly larger than the dual node deltaCt measurement dependent on the low ground mass condition.

The following is an example set of equations for adjusting for low ground mass. The following is for example purposes only and not intended to limit the scope of the invention. Specifically, other equations and functions may be used without departing from the scope of the invention.

Equation 1 (Eq. 1) shows an example equation for determining the first-order low ground mass correction factor for the dual nodes.

$$C_{LGM}(D) = \frac{C_{FRx}(P) * C_{FTx}(D)}{C_{FS} + C_{GRD}} \quad \text{(Eq. 1)}$$

In Eq. 1, $C_{LGM}(D)$ is the low ground mass correction factor for dual nodes, and $C_{FRx}(P)$ is the received capacitance on the primary node. In this example, $C_{FRx}(P)$ coincides with the received capacitance on the dual node under consideration. $C_{FTx}(D)$ is the transmitted signal on the dual node, $C_{FS}$ is the capacitive coupling between finger and device, and $C_{GRD}$ is the capacitive coupling in series between finger-universe and universe-device.

Equation 2 (Eq. 2) shows an example equation for determining the low ground mass correction factor for the primary nodes.

$$C_{LGM}(P) = C_{LGM}(D) \frac{\tilde{C}_{FTx}(P)}{\tilde{C}_{FTx}(D)} \quad \text{(Eq. 2)}$$

In Eq. 2, $C_{LGM}(P)$ is the low ground mass correction factor for primary nodes, $\tilde{C}_{FTx}(P)$ is the absolute capacitance measurement over the primary node, $\tilde{C}_{FTx}(D)$ is the absolute capacitance measurement over the adjacent neighboring dual node to the primary node, and $C_{LGM}(D)$ is the low ground mass correction factor for dual nodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for a capacitive sensing device comprising:
   a plurality of transmitter electrodes configured to transmit transmitter signals;
   a plurality of receiver electrodes configured to receive resulting signals comprising effects corresponding to the transmitter signals;
   a plurality of dual nodes corresponding to a first capacitive coupling between the plurality of transmitter electrodes and the plurality of receiver electrodes, wherein the plurality of dual nodes are configured to determine a low ground mass measurement that describes a ground mass state of the capacitive sensing device; and
   a plurality of primary nodes corresponding to a second capacitive coupling between the plurality of transmitter electrodes and the plurality of receiver electrodes,
   wherein the plurality of primary nodes are configured to determine a plurality of capacitive measurements that describe a location of an input object in a sensing region of the capacitive sensing device,
   wherein the first capacitive coupling is less than the second capacitive coupling.

2. The system of claim 1, wherein the plurality of transmitter electrodes comprises a first transmitter electrode and a second transmitter electrode, wherein the plurality of receiver electrodes comprises a first receiver electrode, and wherein the first receiver electrode forms a first dual node of the plurality of dual nodes with the first transmitter electrode and forms a first primary node of the plurality of primary nodes with the second transmitter electrode.

3. The system of claim 2, wherein the plurality of receiver electrodes further comprises a second receiver electrode, and wherein the second receiver electrode forms a second dual node of the plurality of dual nodes with the second transmitter electrode and forms a second primary node of the plurality of primary nodes with the first transmitter electrode.

4. The system of claim 2, wherein the plurality of receiver electrodes further comprises a second receiver electrode, and wherein the second receiver electrode forms a second dual node of the plurality of dual nodes with the first transmitter electrode and forms a second primary node of the plurality of primary nodes with the second transmitter electrode.

5. The system of claim 1, wherein the plurality of dual nodes and the plurality of primary nodes comprises a first spacing between adjacent nodes that is less than a second spacing between adjacent nodes in the plurality of dual nodes.

6. The system of claim 1, wherein the plurality of dual nodes and plurality of primary nodes comprises a first spacing between adjacent nodes that is equivalent to a second spacing between adjacent nodes in the plurality of dual nodes.

7. The system of claim 1, wherein the plurality of transmitter electrodes and the plurality of receiver electrodes are located on a same side of at least one substrate.

8. The system of claim 1, wherein the plurality of transmitter electrodes and the plurality of receiver electrodes are located on different sides of at least one substrate.

9. The system of claim 1, further comprising:
   a processing system configured to:
      transmit a plurality of transmitter signals with the plurality of transmitter electrodes,
      receive, with the plurality of receiver electrodes, a first plurality of resulting signals and a second plurality of resulting signals, wherein the first plurality of resulting signals correspond to the plurality of dual nodes and the second plurality of resulting signals correspond to the plurality of primary nodes,
      determine a low ground mass measurement of the plurality of dual nodes using the first plurality of resulting signals,
      determine a low ground mass measurement of the plurality of primary nodes using the low ground mass measurement of the plurality of dual nodes, and
      determine positional information of an input object using the low ground mass measurement of the plurality of primary nodes and the second plurality of resulting signals.

10. The system of claim 1, further comprising:
    a processing system configured to:
       transmit a plurality of transmitter signals with the plurality of transmitter electrodes and receive a plurality of resulting signals with the plurality of receiver electrodes,
       obtain, from the plurality of resulting signals:
          a first plurality of mutual capacitance measurements corresponding to the plurality of dual nodes,
          a second plurality of mutual capacitance measurements corresponding to the plurality of primary nodes, and
          a plurality of absolute capacitance measurements,
       determine a ratio for the plurality of absolute capacitance measurements, determine a low ground mass measurement of the plurality of dual nodes using the first plurality of mutual capacitance measurements, determine a low ground mass measurement of the plurality of primary nodes using the low ground mass measurement of the plurality of dual nodes and the ratio, and determine positional information of an input object using the low ground mass measurement of the plurality of primary nodes and the second plurality of mutual capacitance measurements.

11. A processing system for a capacitive sensing device, comprising:

a sensor module coupled to a plurality of transmitter electrodes, a plurality of receiver electrodes, a plurality of dual nodes corresponding to a first capacitive coupling between the plurality of transmitter electrodes and plurality of receiver electrodes, and a plurality of primary nodes corresponding to a second capacitive coupling between the plurality of transmitter electrodes and the plurality of receiver electrodes, wherein the sensor module configured to transmit a plurality of transmitter signals with the plurality of transmitter electrodes and receive, with the plurality of receiver electrodes, a first plurality of resulting signals and a second plurality of resulting signals; and a determination module configured to:
  acquire, using the plurality of dual nodes, a first capacitive measurement using the first plurality of resulting signals, wherein the plurality of dual nodes are configured to determine a low ground mass measurement that describes a ground mass state of the capacitive sensing device,
  acquire, using the plurality of primary nodes, a second capacitive measurement using the second plurality of resulting signals, wherein the plurality of primary nodes are configured to determine capacitive measurements that describe a location of an input object in a sensing region of the capacitive sensing device,
  determine a first low ground mass measurement based on the first capacitive measurement,
  adjust, using the first low ground mass measurement, the second capacitive measurement to generate an adjusted capacitive measurement,
  determine positional information based on the adjusted capacitive measurement, and
  report the positional information.

12. The processing system of claim 11, wherein adjusting the second capacitive measurement comprises:
  determine a second low ground mass measurement using the first low ground mass measurement, and
  correct the second capacitive measurement using the second low ground mass measurement.

13. The processing system of claim 11, wherein the first capacitive measurement and second capacitive measurement are mutual capacitive measurements,
  wherein the sensor module is further configured to receive, with the plurality of receiver electrodes, a third plurality of resulting signals, and
  wherein the determination module is further configured to:
    acquire a plurality of absolute capacitance measurements based on the third plurality of resulting signals,
    determine a ratio for the plurality of absolute capacitance measurements, and
    adjusting the second capacitive measurement using the first low ground mass measurement and the ratio.

14. A capacitive input device comprising:
a plurality of transmitter electrodes configured to transmit a plurality of transmitter signals;
a plurality of receiver electrodes configured to receive resulting signals comprising effects corresponding to the plurality of transmitter signals;
a plurality of dual nodes corresponding to a first capacitive coupling between the plurality of transmitter electrodes and the plurality of receiver electrodes; and
a plurality of primary nodes corresponding to a second capacitive coupling between the plurality of transmitter electrodes and the plurality of receiver electrodes, wherein the second capacitive coupling is greater than the first capacitive coupling; and
a processing system configured to:
  transmit the plurality of transmitter signals with the plurality of transmitter electrodes;
  receive, with the plurality of receiver electrodes, a first plurality of resulting signals and a second plurality of resulting signals;
  acquire a first capacitive measurement using the plurality of dual nodes and the first plurality of resulting signals, the first capacitive measurement,
  acquire a second capacitive measurement using the plurality of primary nodes and the second plurality of resulting signals, the second capacitive measurement, wherein the plurality of primary nodes are configured to determine capacitive measurements that describe a location of an input object in a sensing region of the capacitive sensing device
  determine, by the dual nodes, a first low ground mass measurement based on the first capacitive measurement, wherein the first low ground mass measurement describes a ground mass state of the capacitive sensing device,
  adjust, using the first low ground mass measurement, the second capacitive measurement to generate an adjusted capacitive measurement,
  determine positional information based on the adjusted capacitive measurement, and
  report the positional information.

15. The input device of claim 14, wherein adjusting the second capacitive measurement comprises:
  determine a second low ground mass measurement using the first low ground mass measurement, and
  correct the second capacitive measurement using the second low ground mass measurement.

16. The input device of claim 14, wherein the first capacitive measurement and second capacitive measurement are mutual capacitive measurements, and wherein the processing system is further configured to:
  receive, with the plurality of receiver electrodes, a third plurality of resulting signals,
  acquire a plurality of absolute capacitance measurements based on the third plurality of resulting signals,
  determine a ratio for the first plurality of absolute capacitance measurements, and
  adjusting the second capacitive measurement using the first low ground mass measurement and the ratio.

17. The input device of claim 14, wherein the plurality of transmitter electrodes comprises a first transmitter electrode and a second transmitter electrode, wherein the plurality of receiver electrodes comprises a first receiver electrode, and wherein the first receiver electrode forms a first dual node of the plurality of dual nodes with the first transmitter electrode and forms a first primary node of the plurality of primary nodes with the second transmitter electrode.

18. The input device of claim 17, wherein the plurality of receiver electrodes further comprises a second receiver electrode, and wherein the second receiver electrode forms a second dual node of the plurality of dual nodes with the second transmitter electrode and forms a second primary node of the plurality of primary nodes with the first transmitter electrode.

* * * * *